United States Patent
Ostkamp

(10) Patent No.: US 10,639,648 B2
(45) Date of Patent: May 5, 2020

(54) ROLLING BEARING COOLING ARRANGEMENT USING LUBRICANT AND COOLING AIR FOR CENTRIFUGES

(71) Applicant: GEA MECHANICAL EQUIPMENT GMBH, Oelde (DE)

(72) Inventor: Wilhelm Ostkamp, Oelde (DE)

(73) Assignee: GEA MECHANICAL EQUIPMENT GmbH, Oelde (DE)

(*) Notice: Subject to any disclaimer, the term of this patent is extended or adjusted under 35 U.S.C. 154(b) by 379 days.

(21) Appl. No.: 15/103,011

(22) PCT Filed: Dec. 4, 2014

(86) PCT No.: PCT/EP2014/076528
§ 371 (c)(1),
(2) Date: Jun. 9, 2016

(87) PCT Pub. No.: WO2015/090994
PCT Pub. Date: Jun. 25, 2015

(65) Prior Publication Data
US 2016/0310969 A1  Oct. 27, 2016

(30) Foreign Application Priority Data
Dec. 19, 2013  (DE) .................. 10 2013 114 510

(51) Int. Cl.
*B04B 9/12* (2006.01)
*F16C 37/00* (2006.01)
(Continued)

(52) U.S. Cl.
CPC .............. *B04B 9/12* (2013.01); *B04B 1/20* (2013.01); *F16C 33/667* (2013.01);
(Continued)

(58) Field of Classification Search
CPC ..... B04B 9/12; B04B 1/20; B04B 9/04; F16C 33/6685; F16C 33/6659; F16C 33/667; F16C 37/007; F16C 2320/42
(Continued)

(56) References Cited

U.S. PATENT DOCUMENTS

| 1,598,393 A | * | 8/1926 | Robertson ................. B04B 9/04 184/6.18 |
| 1,745,853 A | * | 2/1930 | Krantz ..................... B04B 9/12 248/638 |

(Continued)

FOREIGN PATENT DOCUMENTS

DE  1 147 447  4/1963
DE  1 943 204  4/1970
(Continued)

OTHER PUBLICATIONS

International Search Report in related International Application No. PCT/EP2014/076528 dated Feb. 19, 2015.
(Continued)

*Primary Examiner* — Charles Cooley
(74) *Attorney, Agent, or Firm* — Patent Portfolio Builders PLLC

(57) ABSTRACT

A rolling bearing-cooling device for a bearing arrangement is provided. The bearing arrangement includes at least one rolling bearing for mounting a drum of a decanter centrifuge or solid bowl centrifuge. The rolling bearing-cooling device includes a lubricant supply line, a lubricant discharge line, a cooling air supply line, and a cooling air discharge line. The lubricant supply line is spaced from the cooling air supply line and is opposite the cooling air discharge line, and the cooling air supply line is opposite the lubricant discharge line with regard to the rolling bearing.

9 Claims, 4 Drawing Sheets

(51) Int. Cl.
  *F16C 33/66* (2006.01)
  *B04B 1/20* (2006.01)
(52) U.S. Cl.
  CPC ...... *F16C 33/6659* (2013.01); *F16C 33/6685* (2013.01); *F16C 37/007* (2013.01); *F16C 2320/42* (2013.01)
(58) Field of Classification Search
  USPC .............................. 384/467, 476; 494/15, 53
  See application file for complete search history.

(56) References Cited

U.S. PATENT DOCUMENTS

| | | | | |
|---|---|---|---|---|
| 2,398,944 A * | 4/1946 | Kopetz | ..................... | F16N 7/40 184/6 |
| 3,042,462 A * | 7/1962 | Rosskopf | .................. | F16N 7/32 384/466 |
| 3,285,506 A * | 11/1966 | Reed | ......................... | B04B 1/20 384/142 |
| 3,315,882 A * | 4/1967 | Reed | ......................... | B04B 1/20 277/353 |
| 3,318,644 A * | 5/1967 | Johnson, III | ........ | F16C 33/6659 184/31 |
| 3,428,247 A * | 2/1969 | Andresen | .................. | B04B 1/20 494/15 |
| 3,502,954 A * | 3/1970 | Moore | ...................... | B04B 5/08 310/90 |
| 3,604,617 A * | 9/1971 | Patterson | .................. | B04B 5/04 184/13.1 |
| 3,604,769 A | 9/1971 | Latham | | |
| 3,729,128 A * | 4/1973 | Reed | ......................... | B04B 1/20 494/15 |
| 3,767,013 A * | 10/1973 | Caldwell | ............... | F16C 33/664 184/6.18 |
| 4,205,779 A * | 6/1980 | Jacobson | .................. | B04B 9/04 494/14 |
| 4,226,359 A * | 10/1980 | Jacobson | .................. | B04B 9/04 494/39 |
| 4,322,030 A * | 3/1982 | Jacobson | .................. | B04B 9/04 184/31 |
| 4,527,661 A * | 7/1985 | Johnstone | ............ | B23Q 11/121 184/6.1 |
| 4,654,023 A * | 3/1987 | Foldhazy | .................. | B04B 9/12 277/362 |
| 4,946,433 A * | 8/1990 | Gorodissky | ............... | B04B 9/02 184/31 |
| 5,051,007 A * | 9/1991 | Maddox | .................... | F04D 1/14 384/465 |
| 5,192,139 A * | 3/1993 | Hiramoto | ................. | B23Q 1/70 384/475 |
| 6,117,063 A * | 9/2000 | Szepessy | .................. | B04B 9/12 384/467 |
| 6,228,016 B1 * | 5/2001 | Kristensen | ................ | B04B 9/12 384/467 |
| 6,267,204 B1 * | 7/2001 | Kristensen | ................ | B04B 9/12 184/6.12 |
| 6,988,980 B2 * | 1/2006 | Moss | ........................ | B04B 9/12 184/6.18 |
| 7,500,311 B2 * | 3/2009 | Shimomura | ........ | F16C 33/6659 |
| 7,594,757 B2 * | 9/2009 | Verhaegen | .......... | F16C 33/6651 184/104.3 |
| 7,600,921 B2 * | 10/2009 | Moller | ..................... | B23Q 1/70 384/462 |
| 8,287,441 B2 * | 10/2012 | Wick | ........................ | B03B 9/02 210/380.3 |
| 8,302,737 B2 * | 11/2012 | Yanohara | ............ | F16C 33/6674 184/6.1 |
| 8,444,542 B2 * | 5/2013 | Ostkamp | ................ | B04B 1/2016 494/14 |
| 8,652,021 B2 * | 2/2014 | Yumoto | .................... | B04B 1/20 184/6 |
| 9,186,686 B2 * | 11/2015 | Mackel | ..................... | B04B 9/12 |
| 9,238,233 B2 * | 1/2016 | Morita | ..................... | B04B 9/12 |
| 9,541,137 B2 * | 1/2017 | Mori | .................... | F16C 33/6659 |
| 2005/0065010 A1 * | 3/2005 | Moss | ........................ | B04B 9/12 494/15 |
| 2007/0177835 A1 * | 8/2007 | Verhaegen | .......... | F16C 33/6651 384/462 |
| 2009/0129714 A1 | 5/2009 | Shimomura | | |
| 2009/0148088 A1 * | 6/2009 | Sasabe | .................. | F16C 19/548 384/467 |
| 2012/0071313 A1 * | 3/2012 | MacKel | .................... | B04B 9/04 494/11 |
| 2013/0190160 A1 * | 7/2013 | Yumoto | .................... | B04B 1/20 494/15 |
| 2015/0126352 A1 * | 5/2015 | Morita | ..................... | B04B 1/20 494/15 |
| 2015/0226266 A1 * | 8/2015 | Mori | ....................... | F16C 33/76 384/467 |
| 2016/0310969 A1 * | 10/2016 | Ostkamp | ................ | B04B 1/20 |
| 2016/0377123 A1 * | 12/2016 | Yoshino | ............. | F16C 33/6662 384/476 |

FOREIGN PATENT DOCUMENTS

| | | | |
|---|---|---|---|
| DE | 10 2008 015 134 A1 | 10/2009 | |
| DE | 10 2009 022 972 A1 | 12/2010 | |
| EP | 2 435 189 B1 | 4/2012 | |
| EP | 3163104 A1 * | 5/2017 | |
| GB | 1093480 | * 12/1967 | |
| JP | 04016254 A * | 1/1992 | ............ F16N 7/366 |

OTHER PUBLICATIONS

Written Opinion in related International Application No. PCT/EP2014/076528 dated Feb. 19, 2015.

\* cited by examiner

ROLLING BEARING COOLING ARRANGEMENT USING LUBRICANT AND COOLING AIR FOR CENTRIFUGES

BACKGROUND AND SUMMARY OF THE INVENTION

Exemplary embodiments of the present invention relate to a bearing arrangement having at least one roller bearing for bearing a bowl of a centrifuge, which has a rolling bearing cooling apparatus.

Decanter centrifuges or solid bowl centrifuges are known from the relevant prior art and are preferably used where a material for centrifuging is to be clarified by removing solids, and/or the material for centrifuging is to be separated into phases of different densities. One type of construction for a decanter centrifuge or solid bowl centrifuge is the so-called counter-current decanter. The rotor of a centrifuge of this kind comprises a bowl with a solid casing, preferably having a cylindrical and a conical part, and a worm element mounted therein. Both rotate at high speed, wherein the worm has a comparatively small differential speed in relation to the bowl. Exemplary embodiments of the invention are particularly well-suited to centrifuges of this kind.

The rotor is conventionally driven by an electric motor via a power transmission drive, such as a V-belt drive. It is conventionally mounted in rolling bearings at both ends. To avoid vibrations, the rotating parts of a decanter centrifuge should be of appropriately stiff construction. This requires correspondingly generously sized diameters for the rotating components.

This results in the peripheral speeds of rolling bearings being relatively high. For this reason, alternative constructions that attempt to obviate the above-mentioned problem have been created. In one alternative construction, the bearings are of resilient design, with the result that in the event of imbalances the rotor can adopt a new line of centroid.

German patent document DE 1 943 204 discloses a shaft assembly for centrifuges and similar devices. There is room for improvement, in the solution proposed in DE 1 943 204 for the proposed bearing cooling, as regards the markedly large number of parts that serve to dissipate heat from the bearing and have to be integrated into the centrifugal separator by means of a complex construction.

German patent document DE 10 2008 015 134 A1 proposes a gear arrangement of a solid bowl centrifuge. For lubricating the elements of the gear arrangement that have to be lubricated, a type of lubricant compensation system, preferably a lubricant compensation circuit, is used, by means of which a flowable lubricant—preferably a lubricating oil—can be fed into the gear arrangement. The lubricant is guided into a bore, made centrally in a drive shaft, via a rotary leadthrough, and arrives in the region of a bearing to be lubricated via a bore in the drive shaft that is arranged in the radial direction.

German patent document DE 10 2009 022 972 A1 proposes a centrifuge having a lubricant system. The lubricant system has an injection lubricator that performs the function of minimum quantity lubrication of the bearing of the centrifuge.

The solutions for lubricant supply and bearing cooling have proved themselves fully in practice, but an increase in the service life of the bearings—also in respect of an increased service interval of the decanter centrifuges or solid bowl centrifuges, which usually operate on a continuous basis—is nonetheless desirable.

Thus, exemplary embodiments of the invention are directed to addressing this problem.

Cooling of the rolling bearing increases the service life thereof in a simple manner and can also result in an increase to the service interval. The lower operating temperature results in a thicker film of separating lubricant in the rolling bearing contact and a longer working life for the lubricating oil.

In a particularly advantageous variant embodiment of the present invention, a continuous flow of lubricant that is supplied to the rolling bearing to be cooled through the lubricant supply line, or a continuous cooling air flow that is supplied to the rolling bearing to be cooled through the cooling air supply line, is guided through the opening in the rolling bearing between the rolling bearing inner ring and the rolling bearing outer ring. However, a pulsed supply of the lubricant in small pulses is also conceivable. It is possible for the cooling air also to be supplied only some of the time.

According to a variant, the lubricant and the cooling air are discharged together through a single line. This variant is particularly simple in construction, and is especially suitable for the pulsed supply or lubricant and/or oil. An oil separator is preferably added in this variant.

According to another variant, the lubricant and the cooling air are discharged through separate lines. This variant is somewhat more complex in construction but makes it possible to discharge the cooling air and the lubricant separately.

It is also possible for the cooling air supply line and the lubricant supply line to take the form of a single integrated line and for cooling air and lubricant to be supplied alternately in pulsed manner. The pulses may also be of different lengths. Supply through separate channels is particularly advantageous.

Advantageously, the lubricant supply line is formed by a bore that narrows downstream in the manner of a nozzle and opens into an inner space in a housing, in a nozzle in the region of a rolling bearing. As a result of the nozzle-like form of the lubricant supply line, the flow rate of the lubricant is increased, with the result that, in particular if a minimum quantity lubrication is used, the metering of lubricant can be performed in high-frequency pulses.

In a further advantageous variant embodiment of the invention, a rolling bearing is sealed off from the surrounding environment and from a hollow shaft by seals, wherein the seals that seal the rolling bearing off from the surrounding environment are dynamic seals. As a result, both the lubricant flow and in particular also the cooling air flow can be fed in targeted manner to the bearing that is to be lubricated and cooled, without the two flows repeatedly dividing and their effectiveness in relatively large inner spaces in the housing thus being lost or limited.

BRIEF DESCRIPTION OF THE DRAWING FIGURES

Exemplary embodiments of the subject matter according to the invention are illustrated in the drawing and described in more detail below. In the drawing.

DETAILED DESCRIPTION

Figure 1:
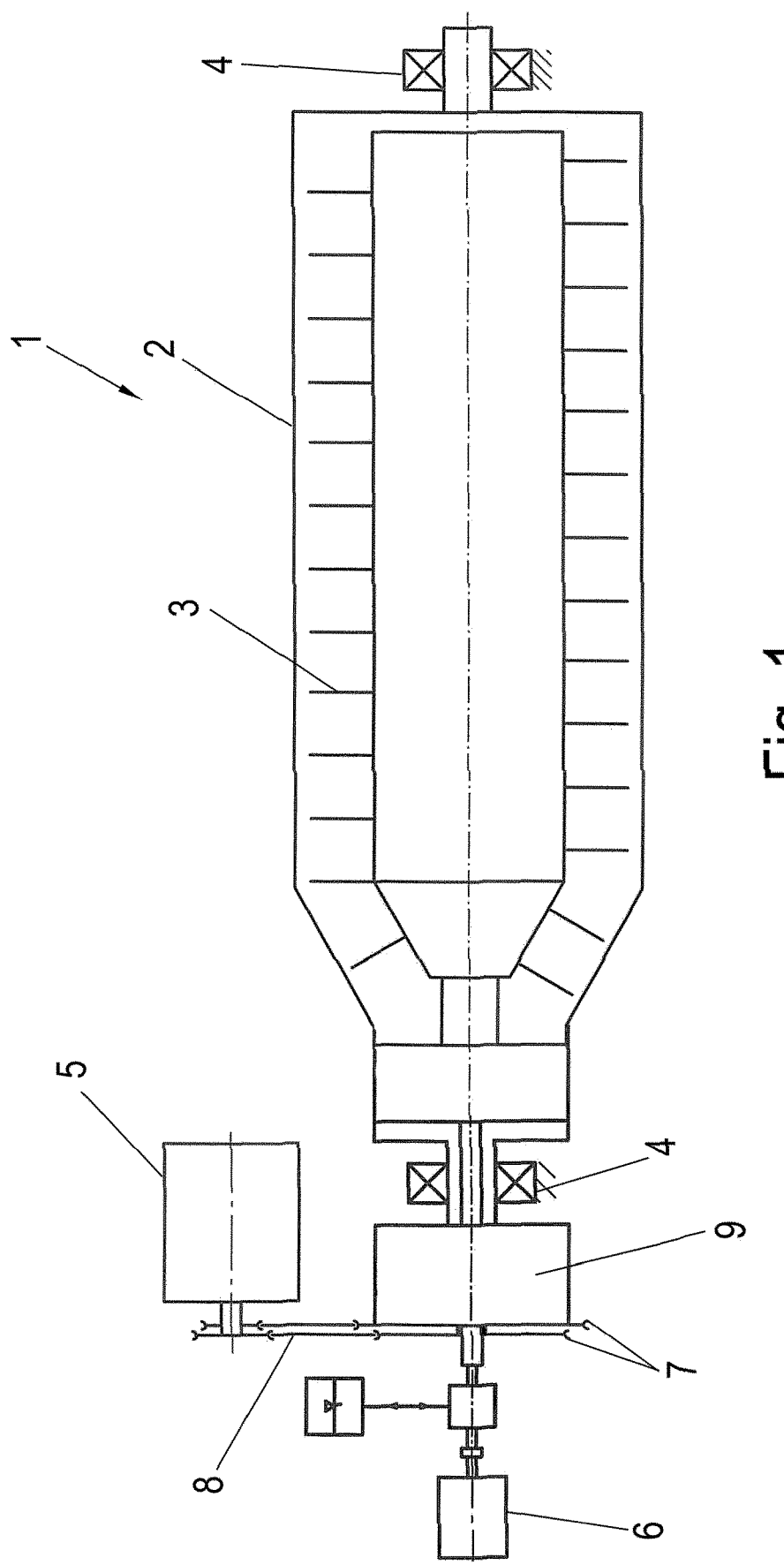
FIG. 1 shows a schematic front view of a decanter centrifuge or solid bowl centrifuge.
Figure 2:
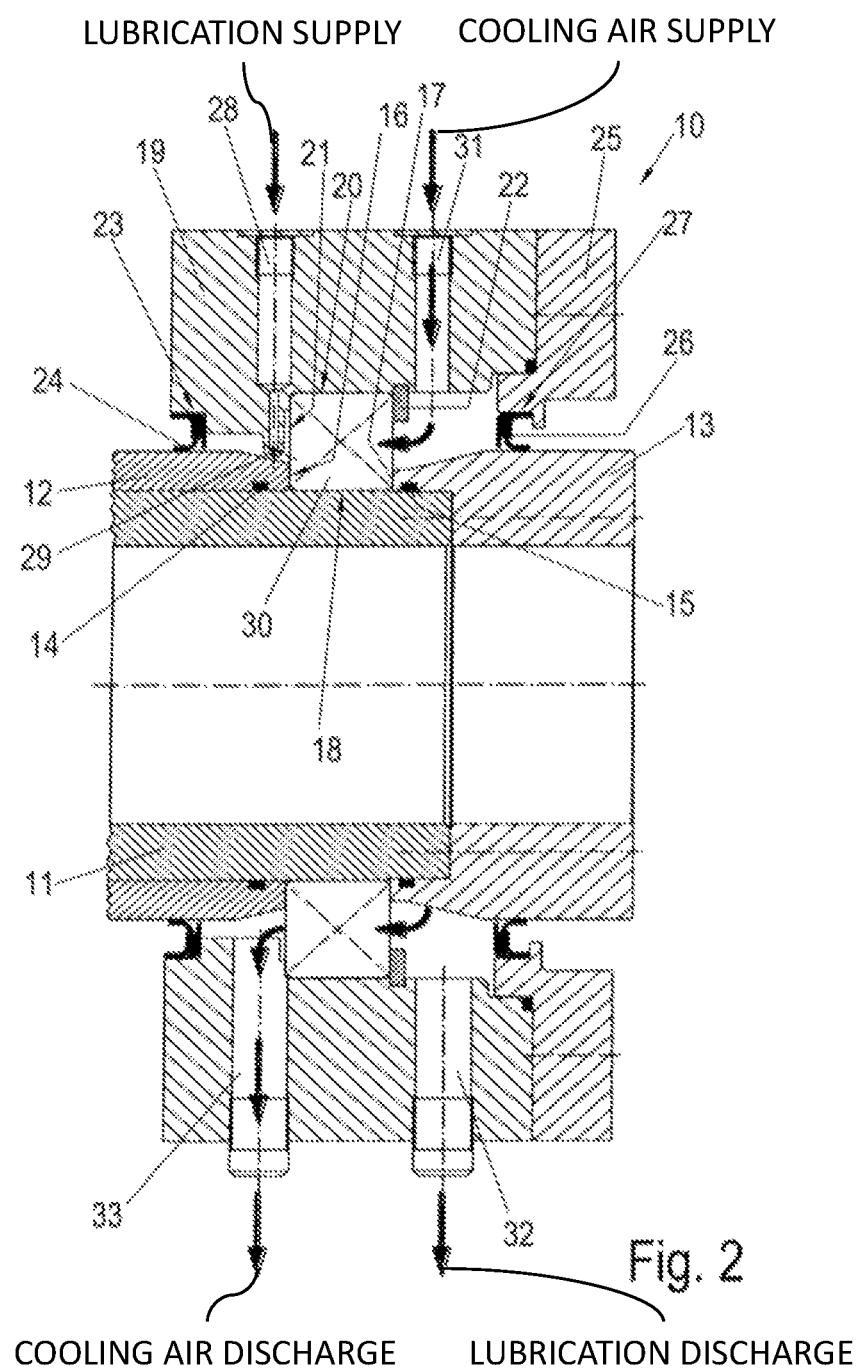
FIG. 2 shows a front view of a first variant of a rolling bearing cooling apparatus according to the invention, in section.

FIG. 1 schematically illustrates a front view of a decanter centrifuge or solid bowl centrifuge 1, called a centrifuge below for short. The centrifuge 1 has a rotatable bowl 2. The bowl 2 is mounted rotatably on two bowl bearings 4. The bowl bearings 4 are preferably in the form of rolling bearings 30 (FIG. 2). Furthermore, the centrifuge 1 has a worm 3 that is arranged coaxially in the bowl 2. The bowl 3 is driven by a drive motor 5 via a power transmission drive, which in this case, by way of example, has belt pulleys 7 and drive belt 8. The power transmission drive acts on a further gear 9 that drives the bowl 4. The centrifuge preferably furthermore has a further drive motor 6, which serves to drive the worm 3 via the gear 9 and brings about a differential speed in relation to the bowl 2.

Figure 3:
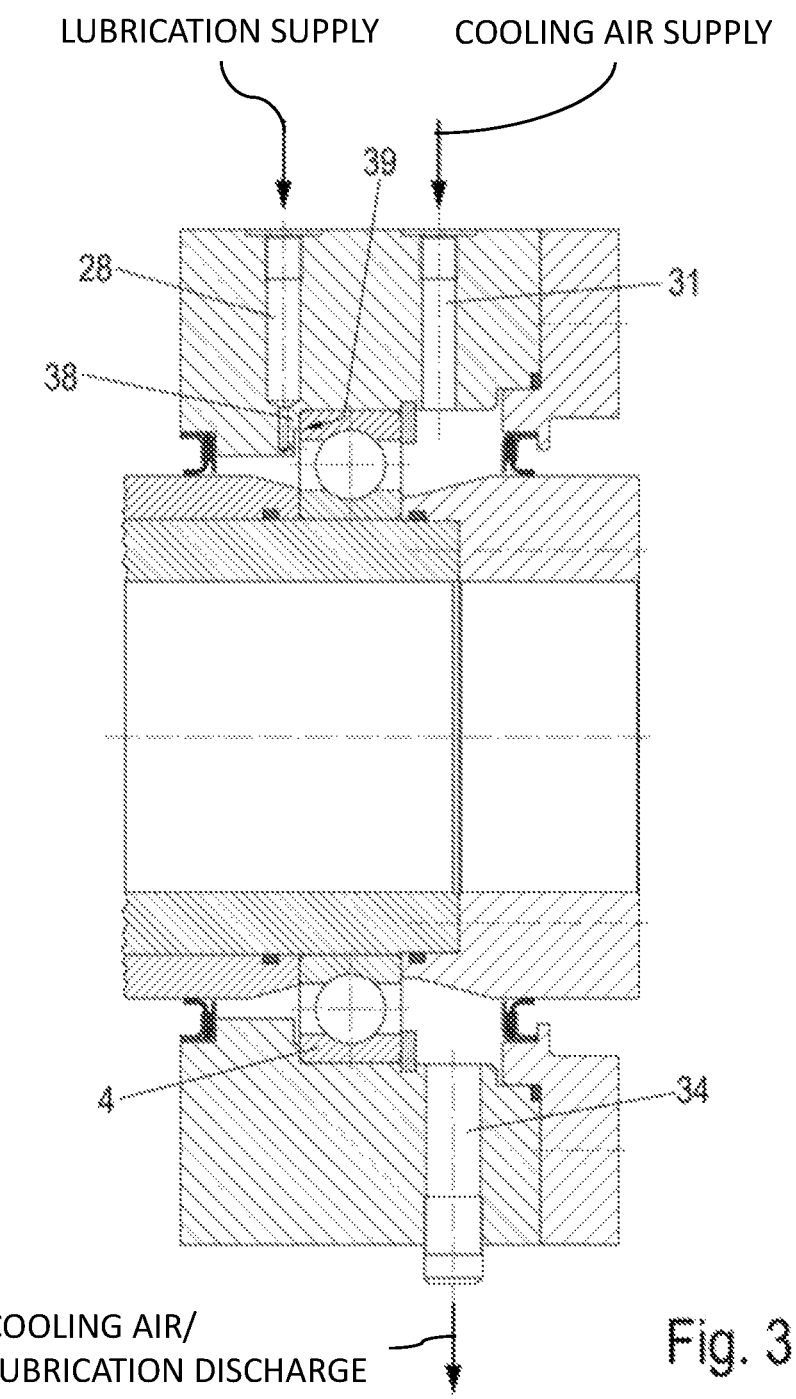
FIG. 3 shows a front view of a second variant of a rolling bearing cooling apparatus according to the invention, in section.
Figure 4:
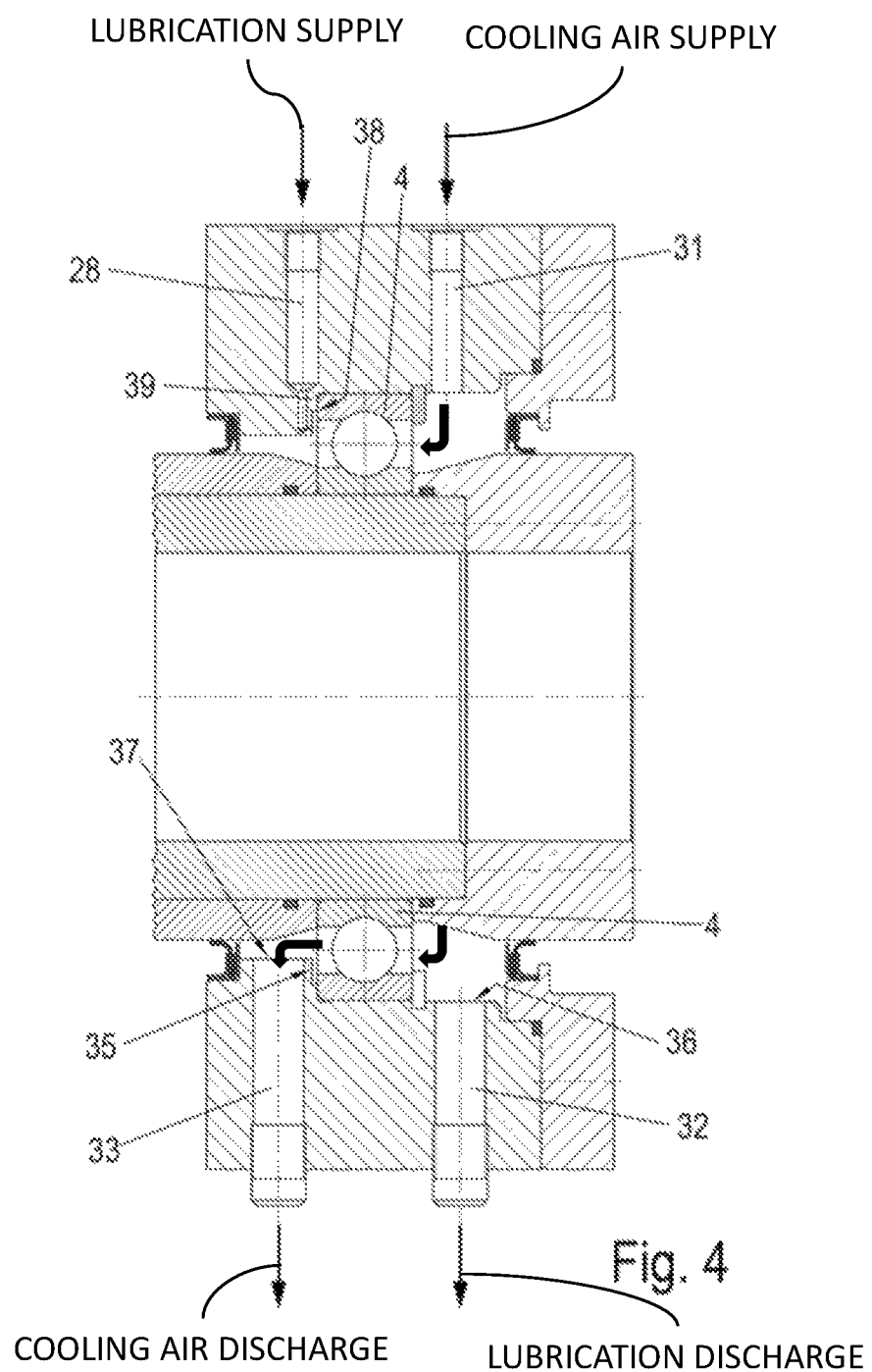
FIG. 4 shows a front view of a third variant of a rolling bearing cooling apparatus according to the invention, in section.

In FIGS. 2 to 4, bearing arrangements that each have a rolling bearing are illustrated with exemplary and advantageous variants of rolling bearing air cooling systems 1 according to the invention. Conceivable rolling bearing arrangements also include double-row rolling bearings or two rolling bearings next to one another. Furthermore, grooved ball bearings, angular contact ball bearings and/or cylindrical roller bearings are possible.

The rolling bearing arrangement of the bowl bearing 4 in FIGS. 2, 3 and 4 has a hollow shaft 11, onto which a ring 12 and a further ring 13 are pushed. Both rings 12, 13 are sealed off from the hollow shaft 11 by seals 14, 15. The ring 13 is secured to the hollow shaft 11 in the axial direction by securing elements such as screws (not illustrated). The two rings 12, 13 each form a shaft shoulder 16, 17 and hold a rolling bearing inner ring 18 axially firmly in place on the hollow shaft 11. The rings 12, 13 moreover widen from the bearing 4, in this case each preferably conically, or have conical regions. The rings 12, 13 abut against the bearing 4 at a radius that lies further inward As a result of the conical portions, it is ensured properly and in a structurally simple manner that the lubricant can flow properly from the outlet opening of the lubricant supply line and into the bearing and can be distributed there.

Furthermore, the rolling bearing arrangement has a housing 19. In the region of a rolling bearing outer ring 20, the housing 19 forms a housing shoulder 21 against which the rolling bearing outer ring 20 is held axially firmly in place on the housing side. Moreover, the housing 19 has a securing ring 22 for housings, which holds the rolling bearing outer ring 20 axially firmly in place on the housing side.

The housing 19 further has a step 23 into which a seal 24 is inserted. The seal 24 is supported against the ring 12 on the shaft side and acts as a dynamic seal, similarly to a radial shaft seal ring.

Moreover, the rolling bearing arrangement has a cover 25 secured in the axial direction by securing elements, such as screws (not illustrated), to the housing 19. The cover 25 has a seal 26 on the housing side. The cover 25 furthermore has a step 27 into which the seal 26 is inserted. The seal 26 is supported against the ring 13 on the shaft side and acts as a dynamic seal, in this case a radial shaft seal ring. Also conceivable are other sealing arrangements such as double-acting shaft seal rings, bearing ring seals or two or more radial shaft seal rings.

The housing 19 moreover has a lubricant supply line 28 in the form of a bore having a diameter narrowing downstream in the shape of a nozzle. The bore opens into a nozzle 29 located in the housing shoulder 21, with the result that a lubricant flow fed through the nozzle 29 and between the rolling bearing inner ring 18 and the rolling bearing outer ring 20 is fed into the rolling bearing 30. The outlet of the lubricant supply line may also be oriented entirely radially and/or also obliquely (between the radial direction axial direction) or entirely axially. In FIG. 2, the lubricant supply line ends just before the conical portion of the ring 12.

In particular, preferably an oil circulating lubrication is implemented, in the manner of a circuit. In this case, preferably 50 l/h to 150 l/h of lubricant circulate in the circuit.

However, the lubricant—preferably lubricating oil—may also be guided for example by the principle of minimum quantity lubrication, in individual small pulses (by the principle of minimum quantity lubrication, which is known per se), through the nozzle 29 and into the rolling bearing 30 (see European Patent document EP 2 435 189 B1). In this case, lubricant quantities of between 5 mm$^3$ and 1000 mm$^3$ are preferably discharged every 60 to 180 s.

Furthermore, the housing 19 has a rolling bearing cooling apparatus. The latter in turn has at least one cooling air supply line 31. Here, the latter is arranged spaced from the lubricant supply line 28 in the direction of the cover 25, and opens into the inner space in the housing 19, here in the region of the securing ring 22. The housing region in which the rolling bearing 30 is arranged is sealed off from the surrounding environment by the seals 24 and 26 and from the hollow shaft 11 by the seals 14, 15. Thus, the lubricant can flow through the rolling bearing 30, and the rolling bearing 30 is lubricated. The cooling air flows around the rolling bearing and cools the latter as it moves past and/or flows through the rolling bearing.

Moreover, the housing 19 has a respective lubricant discharge line 32 and a cooling air discharge line 33.

In relation to the rolling bearing 30, the lubricant supply line 28 is arranged spaced from the cooling air supply line 31 and opposite the cooling air discharge line 33, and the cooling air supply line 31 is arranged opposite the lubricant discharge line 32. The lubricant discharge line 32 lies on the housing side facing the cover, whereas the cooling air discharge line 33 is positioned on the housing side remote from the cover.

As a result of the mutual arrangement of the lubricant supply line 28 and the lubricant discharge line 32 with respect to the cooling air supply line 31 and the cooling air discharge line 33, both the lubricant flow and the cooling air flow are forced to flow through the rolling bearing 30, with the result that heat from the rolling bearing inner ring 18, from the rolling bearing outer ring 20 and from the rolling bearing balls is dissipated through the cooling air flow. The cooling air flow thus acts directly at the points on the rolling bearing 30 at which heat is produced by friction.

As a result, a good cooling action is achieved, in particular by the cooling air flow. As evidence of this effect, tests were performed using a decanter CF 6000 of the Applicant. The speed of rotation of the bowl was approximately 3500 r.p.m. At a cooling air volumetric flow of 10 m$^3$/h, which was at room temperature (approximately 20° C.-25° C.), it was possible to achieve a temperature reduction of the rolling bearing 30 at the operating speed of 18 K, and at a cooling air volumetric flow of 30 m³/h it was possible to achieve a temperature reduction of the rolling bearing 30 at the operating speed of 23 K.

Because of this effect, the invention is particularly advantageous for the centrifugal separation of warm centrifuging material at a high temperature of, for example, more than 100° and/or at very high ambient temperatures of above 25° C. Preferably, the cooling air temperature is to be used at below 25°, in particular below 15° C. The cooling air preferably and advantageously is at a lower temperature than the material for centrifuging—and/or the ambient temperature at the centrifuge.

The result of a temperature reduction of this kind in the rolling bearing 30 at operating speed is a corresponding increase in the service life or an increase in the service interval of the rolling bearing 30, since the cooler lubricant can be used for longer and the bearing is protected. As a result of the lower temperature, in addition there is a favorable effect on viscosity, and a thicker film of separating lubricant is established in the rolling bearing, which reduces wear.

The arrangement of FIG. 2 is particularly advantageous, but other arrangements of the cooling air supply and discharge lines and the lubricant supply and discharge lines are also conceivable. According to FIG. 3, the cooling air discharge line and the lubricant discharge line take the form of a single integrated line 34, with the result that the discharge of cooling air and of lubricant takes place together through this line 34. This variant may be implemented in a structurally particularly simple manner. Preferably, an oil separator (not illustrated here) is connected downstream of the line 34, and may be constructed for example as a hydrocyclone or a filter.

According to FIG. 4, it is furthermore provided for the cooling air discharge line 33 to be arranged spaced from the bearing 4, wherein there is preferably constructed between the cooling air discharge line 33 and the bearing an annular step/gap 35 in which, on rotation, lubricant collects radially outwardly during operation, and can be discharged through the lubricant discharge line 32. Moreover, the inlet opening 36 of the latter lies on a larger radius than that of the inlet opening 37 of the cooling air discharge line 33, with the result that on rotation the flowable lubricant is guided away through the lubricant discharge line 32. In this way, and in a simple manner, oil is prevented from being able to flow into the cooling air inward line 33. This variant thus represents an integrated oil separator. It would also be conceivable to arrange a radially extending plate laterally on the bearing to prevent the lubricant from being able to flow into the cooling air discharge line (not illustrated).

It can also be seen in FIGS. 3 and 4 that the outlet opening 38 of the lubricant supply line 28 lies on a smaller radius of the housing 19 than that of the cooling air supply line 31. Moreover, it is advantageous that the lubricant line does not run exclusively radially in the end region 39 but at an angle, with the result that the lubricating oil is also fed to the bearing 4 with an axial speed component.

LIST OF REFERENCE NUMERALS

1 Decanter centrifuge or solid bowl centrifuge
2 Bowl
3 Worm
4 Bowl bearing
5 Drive motor
6 Drive motor
7 Belt pulleys
8 Drive belt
9 Gear
10 Rolling bearing air cooling system
11 Hollow shaft
12 Ring
13 Ring
14 Seal
15 Seal
16 Shaft shoulder
17 Shaft shoulder
18 Rolling bearing inner ring
19 Housing
20 Rolling bearing outer ring
21 Housing shoulder
22 Securing ring
23 Step
24 Seal
25 Cover
26 Seal
27 Step
28 Lubricant supply line
29 Nozzle
30 Rolling bearing
31 Cooling air supply line
32 Lubricant discharge line
33 Cooling air discharge line
34 Line
35 Gap
36 Inlet opening
37 Inlet opening
38 Outlet opening
39 End region

The invention claimed is:

1. A bearing arrangement, comprising:
a housing, comprising
   a rolling bearing arranged to bear a bowl of a centrifuge; and
   a rolling bearing cooling apparatus, comprising
      a lubricant source;
      a lubricant supply line coupled to the lubricant source;
      a lubricant discharge line;
      a cooling air source;
      a cooling air supply line coupled to the cooling air source; and
      a cooling air discharge line,
      wherein an inlet opening of the lubricant discharge line lies on a larger radius of the housing than that of an inlet opening of the cooling air discharge line, and
      wherein the lubricant and cooling air discharge lines are proximate to the rolling bearing, the lubricant discharge line is arranged on a first lateral side of the rolling bearing relative to the cooling air discharge line, and the cooling air discharge line is arranged on a second lateral side, which is opposite of the first lateral side, of the rolling bearing relative to the lubricant discharge line, and
      wherein a lubricant flow supplied to the rolling bearing through the lubricant supply line and a cooling air flow supplied to the rolling bearing through the cooling air supply line are each guided through axial openings in the rolling bearing, between an inner ring of the rolling bearing and an outer ring of the rolling bearing.

2. The bearing arrangement of claim 1, wherein the lubricant discharge line is arranged separately and spaced from the cooling air discharge line.

3. The bearing arrangement of claim 1, wherein the lubricant supply line is arranged spaced from the cooling air supply line.

4. The bearing arrangement of claim 1, wherein in relation to the rolling bearing, the lubricant supply line is arranged opposite the cooling air discharge line, and the cooling air supply line is arranged opposite the lubricant discharge line.

5. The bearing arrangement of claim 1, wherein the lubricant supply line is a bore that narrows downstream in the form of a nozzle.

6. The bearing arrangement of claim 1, wherein the lubricant supply line opens into an inner space in a housing by a nozzle in a region of the rolling bearing.

7. The bearing arrangement of claim 1, wherein the rolling bearing is sealed off from a surrounding environment and from a hollow shaft by seals.

8. The bearing arrangement of claim 7, wherein the seals that seal the rolling bearing off from the surrounding environment are dynamic seals.

9. A centrifuge, comprising:
a bowl; and
a housing, comprising
   a rolling bearing arranged to bear the bowl of the centrifuge; and
   a rolling bearing cooling apparatus, comprising
a lubricant source;
a lubricant supply line coupled to the lubricant source;
a lubricant discharge line;
a cooling air source;
a cooling air supply line coupled to the cooling air source; and
a cooling air discharge line,
wherein an inlet opening of the lubricant discharge line lies on a larger radius of the housing than that of an inlet opening of the cooling air discharge line, and
wherein the lubricant and cooling air discharge lines are proximate to the rolling bearing, the lubricant discharge line is arranged on a first lateral side of the rolling bearing relative to the cooling air discharge line, and the cooling air discharge line is arranged on a second lateral side, which is opposite of the first lateral side, of the rolling bearing relative to the lubricant discharge line, and
wherein a lubricant flow supplied to the rolling bearing through the lubricant supply line and a cooling air flow supplied to the rolling bearing through the cooling air supply line are each guided through axial openings in the rolling bearing, between an inner ring of the rolling bearing and an outer ring of the rolling bearing.

\* \* \* \* \*